US006592841B2

(12) United States Patent
Fujimoto et al.

(10) Patent No.: US 6,592,841 B2
(45) Date of Patent: Jul. 15, 2003

(54) ADSORBENT FOR NITROGEN OXIDES AND ITS TREATMENT METHOD

(75) Inventors: Kenjiro Fujimoto, Ibaraki (JP); Jun Suzuki, Ibaraki (JP); Toshiyuki Mori, Ibaraki (JP); Mamoru Watanabe, Ibaraki (JP)

(73) Assignee: National Institute for Research in Inorganic Materials, Tsukuba (JP)

( * ) Notice: Subject to any disclaimer, the term of this patent is extended or adjusted under 35 U.S.C. 154(b) by 201 days.

(21) Appl. No.: 09/797,562

(22) Filed: Mar. 5, 2001

(65) Prior Publication Data

US 2002/0032119 A1 Mar. 14, 2002

(30) Foreign Application Priority Data

Sep. 12, 2000 (JP) ......................... 2000-277137

(51) Int. Cl.[7] .................... B01D 59/26; C01G 19/00; C01G 9/00; C01G 23/00
(52) U.S. Cl. ............... 423/594.2; 95/129; 423/594.4; 423/594.6; 423/594.9; 423/596; 423/598; 423/600
(58) Field of Search ............. 423/239.1, 213.2, 423/594.2, 594.6, 594.4, 596, 598, 600, 594.9; 502/414, 342, 344, 352, 355, 341; 95/129

(56) References Cited

U.S. PATENT DOCUMENTS 5,898,015 A * 4/1999 Yokoi et al. ............... 502/414
6,001,319 A * 12/1999 Yokoi et al. ............. 423/239.1
6,471,923 B1 * 10/2002 Becue et al. ............. 423/213.2

\* cited by examiner

*Primary Examiner*—Wayne A. Langel
*Assistant Examiner*—Jonas N. Strickland
(74) *Attorney, Agent, or Firm*—Oblon, Spivak, McClelland, Maier & Neustadt, P.C.

(57) ABSTRACT

A method of treating a hollandite compound to improve its adsorption of nitrogen monoxide, which comprises subjecting a hollandite compound having a hollandite-type crystal structure and represented by a chemical formula $$A_xM_yN_{8-y}O_{16},$$

wherein A is an alkali metal or an alkaline earth metal K, Na, Rb or Ca, M is a bivalent or trivalent metal element Fe, Ga, Zn, In, Cr, Co, Mg, Al or Ni, N is a tetravalent metal element Sn or Ti, $0<x\leq 2$ and $0<y\leq 2$, to a heat treatment in a stream of an oxygen-nitrogen mixture having oxygen gas and nitrogen gas mixed in a volume ratio of 3:97 to 50:50, at a temperature of from 50 to 1,500° C. for from 5 minutes to 1 hour.

6 Claims, 7 Drawing Sheets

ADSORBENT FOR NITROGEN OXIDES AND ITS TREATMENT METHOD

BACKGROUND OF THE INVENTION

1. Field of the Invention

The present invention relates to an adsorbent for nitrogen oxides discharged from automobiles and heat generators, and a method of treating it to improve its adsorptivity.

2. Discussion of Background

Environmental pollution problems are not problems restricted to a narrow zone now, and have developed into big problems to be dealt with globally, and one of which is air pollution. In exhaust gas generated by artificially burning fuel, substances artificially synthesized and decomposition products thereof, substances hazardous to the human body are contained. It is hard to completely remove such substances from sources of release, and they are discharged to living environment in fact. The amount of such hazardous gas discharged increases along with activation of human activity. For example, generation of nitrogen oxide as one of air pollutants is due to exhaust gas from automobiles and heat generators. Along with growth in traffic, area in which the nitrogen oxide concentration exceeds environmental standard as established by Environment Agency of Japan is increasing in urban area.

Under these circumstances, it is necessary to improve technique to remove hazardous gas from sources of release for a comfortable life. Adsorbents for nitrogen oxides reported up to now are ones having a noble metal or its oxide immersed in or supported by a carrier. Among them, three way catalysts used currently can not be used for treatment of exhaust gas containing a large amount of oxygen, such as exhaust gas of e.g. a lean burn engine, since their nitrogen oxide selective reduction activity substantially disappears by presence of only 0.5% of excess oxygen in the exhaust gas, with regard to both Rh type and non-Rh type. Further, zeolite subjected to ion exchange has a low heat resistance, its crystal structure tends to disintegrate when used at a high temperature of at least 700° C., and there are problems in NO adsorption and decomposition activity.

As a material expected as an adsorbent for nitrogen oxides which is a carrier-free adsorbent, amorphous calcium phosphate particles are mentioned (JP-A-7-55586). However, if the heat treatment temperature exceeds 800° C., the amorphous calcium phosphate particles undergo crystallization to decrease their adsorptivity of a gas.

It has been reported that $La_2O_3$ adsorbs nitrogen monoxide recently (B. Klingenberg, et al., Appl. Catal. B: Environmental 21, 19 (1999)), but no function regarding adsorption when oxygen is contained, has been reported.

SUMMARY OF THE INVENTION

The present invention has been made to overcome the above problems, and it is an object of the present invention to provide an excellent adsorbent for nitrogen oxides and a pretreatment method of the adsorbent, free from the above problems.

The present inventors have conducted extensive studies to achieve the above object and as a result, have found that functions of the following material as an adsorbent for nitrogen oxides can be improved by employing the following conditions. The present invention has been accomplished on the basis of this discovery.

DETAILED DESCRIPTION OF THE PREFERRED EMBODIMENTS

Figure 1:
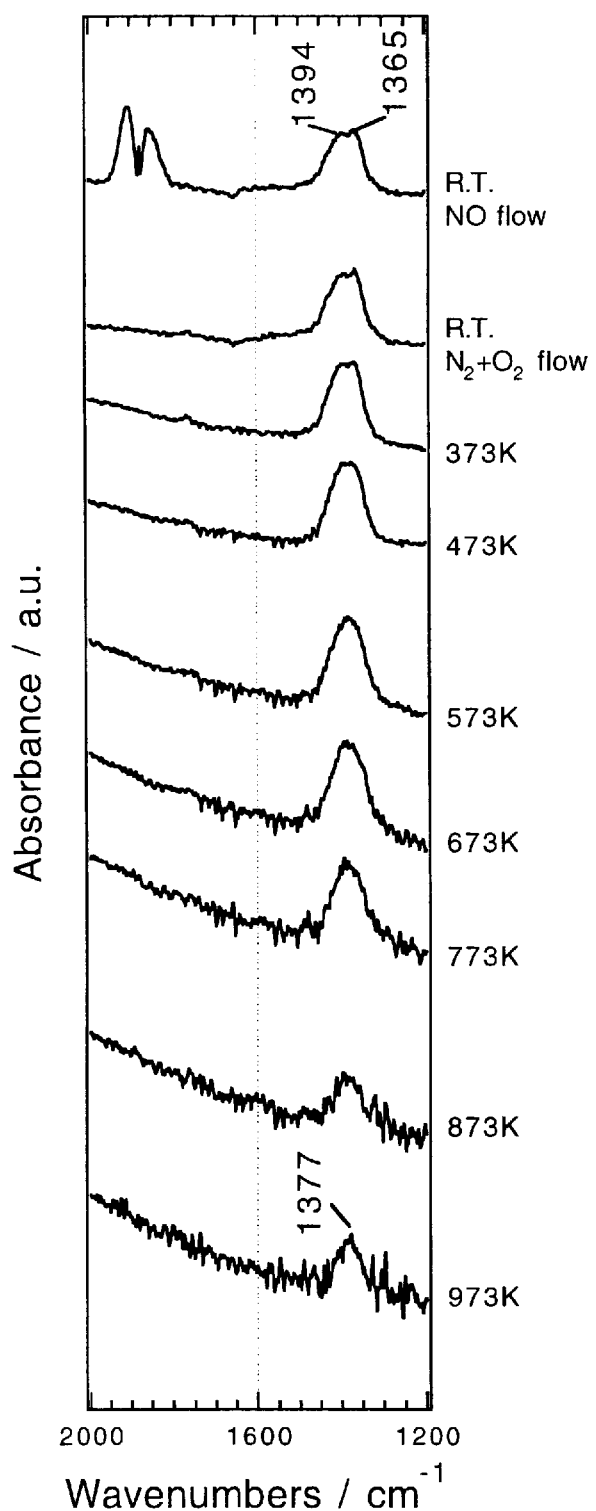
FIG. 1 is a diagram illustrating diffuse reflection infrared spectrum at from room temperature to 973 K [Example 1: carrier gas ($N_2:O_2=60:40$)].

1) The adsorbent for nitrogen oxides of the present invention is a compound having a hollandite-type crystal structure and represented by a chemical formula

$$A_xM_yN_{8-y}O_{16},$$

wherein A is an alkali metal or an alkaline earth metal K, Na, Rb or Ca, M is a bivalent or trivalent metal element Fe, Ga, Zn, In, Cr, Co, Mg, Al or Ni, N is a tetravalent metal element Sn or Ti, $0<x\leq 2$ and $0<y\leq 2$. This compound can be prepared by weighing an oxide, carbonate, nitrate, acetate or metal alcoxide of each element so as to satisfy the desired value of x in the chemical formula, and mixing them, followed by heat treatment, to obtain the compound in a form of a powder or a thin film.

2) The present invention is characterized by subjecting the powder or thin film obtained by the method of the above item 1) to a heat treatment in air or in an atmosphere containing oxygen having a concentration higher than that in air, i.e. in a stream of oxygen-nitrogen mixture having oxygen gas and nitrogen gas mixed in a volume ratio of 3:97 to 50:50, at a temperature of from 50° C. to 1,500° C. for from 5 minutes to 1 hour. If the proportion of the oxygen gas is at most 3%, adsorption of nitrogen oxides into the adsorbent for nitrogen oxides is less likely to take place, and if the proportion of the oxygen gas is at least 50%, adsorption by the adsorbent reaches the limit, and no effect can be obtained. If the treatment temperature is at most 50° C., there is a possibility that impurities remain on the surface of the adsorbent, and accordingly it is necessary to carry out the heat treatment at a temperature of at least 500° C. However, if the heat treatment is carried out at a temperature of at least 1,500° C., crystals of the adsorbent may grow, whereby crystal face necessary for adsorption of nitrogen oxides may disappear, and the adsorption may decrease. If the treatment time is at most 5 minutes, there is a possibility that the surface of the adsorbent may not completely be clarified, but 1 hour is enough to completely clarify the surface of the adsorbent even in a large amount. Here, by increasing the oxygen content in the stream of oxygen-nitrogen mixture, the adsorption of nitrogen oxides can be improved. Nitrogen oxides are adsorbed by the adsorbent for nitrogen oxides immediately after subjected to such a pretreatment.

3) When the pretreatment is carried out under the mixed gas condition as defined in the above item 2), said mixed gas may be diluted with an inert gas such as helium or argon. Even when an inert gas is contained in said mixed gas, adsorption of nitrogen oxides by the adsorbent for nitrogen oxides takes place when oxygen is present in the entire stream. In this case also, by increasing the oxygen content in the stream of oxygen-nitrogen mixture, adsorption of nitrogen oxides can be improved. Nitrogen oxides are adsorbed by the adsorbent for nitrogen oxides immediately after subjected to the pretreatment.

4) Further, the heat treatment may be carried out in a stream of an oxygen-nitrogen mixed gas having oxygen gas and nitrogen gas mixed in a volume ratio of 5:95 to 50:50, under a reduced pressure of at most atmospheric pressure and under a pressure of at least 0.1 atm. Even if the total pressure of the mixed gas of oxygen gas and nitrogen gas is 0.1 atm, adsorption of nitrogen oxides by the adsorbent for nitrogen oxides takes place if oxygen is present in the entire stream. In this case also, by increasing the oxygen content in the stream of oxygen-nitrogen mixture, adsorption of nitrogen oxides can be improved. Nitrogen oxides are adsorbed by the adsorbent for nitrogen oxides immediately after subjected to the pretreatment.

Now, the present invention will be described in detail with reference to Examples and Comparative Examples. It should be understood that the present invention is by no means restricted to such specific Examples.

In the present invention, a method of using oxygen when the adsorbent is subjected to the pretreatment before nitrogen oxides are adsorbed is an important element, and results caused when the conditions are inappropriate are shown as Comparative Examples.

EXAMPLE 1

As a sample, a powder having a composition of $K_{1.9}Ga_{1.9}Sn_{6.1}O_{16}$ prepared by mixing oxides and a carbonate i.e. $K_2CO_3$, $Ga_2O_3$ and $SnO_2$ as materials, followed by heat treatment at a temperature of at least 1,375° C. for 24 hours, was used. As an evaluation method, diffuse reflection infrared spectroscopy (DRIFTS) was employed. The powder sample was subjected to a heat treatment in a stream of a $N_2$—$O_2$ mixed carrier gas (50 ml min$^{-1}$) at 973 K for 15 minutes, and immediately after the heat treatment, NO (about 8,000 ppm) was adsorbed by the sample at room temperature, and then the NO adsorption state on the surface was observed while raising the temperature to 973 K.

With respect to the powder sample subjected to the heat treatment under a carrier gas condition of $N_2$:$O_2$=60:40, DRIFT spectra after NO adsorption at room temperature are shown in FIG. 1. Peaks at 1,850 and 1,904 cm$^{-1}$ are attributable to gaseous phase NO in a diffuse reflection cell. Further, absorptions by $NO_2$ or $NO_3$ molecular species considered to be adsorbed on the surface of $K_{1.9}Ga_{1.9}Sn_{6.1}O_{16}$ were confirmed at 1,365 and 1,394 cm$^{-1}$. In the step of raising the temperature from room temperature to 973 K, the absorption intensity gradually decreased, but absorption species corresponding to a peak at 1,377 cm$^{-1}$ did not disappear to the end.

Figure 2:
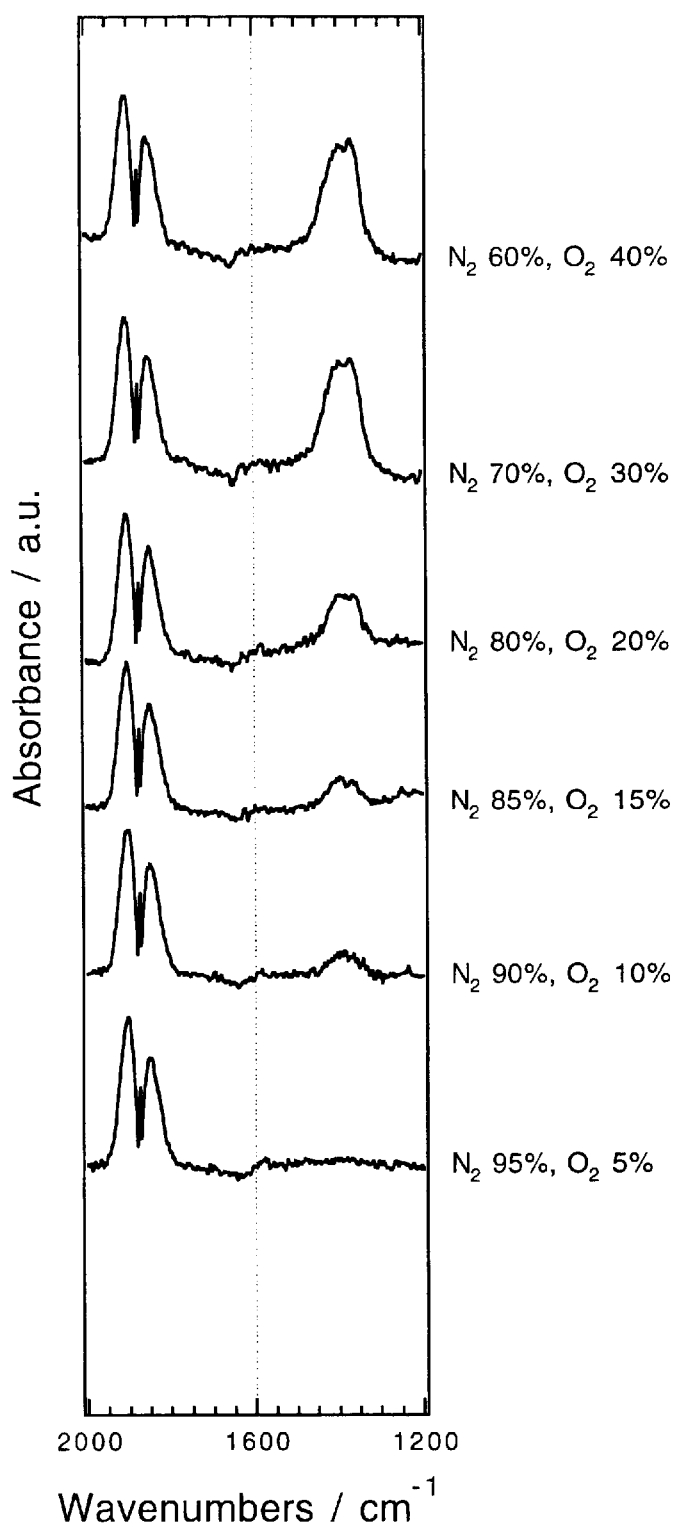
FIG. 2 is a diagram illustrating diffuse reflection infrared spectra at room temperature [Example 1: influence of the proportion of oxygen in a carrier gas].

Then, similar experiments were carried out by changing the proportion of $N_2$ and $O_2$ in the carrier gas. Spectra when NO was adsorbed at room temperature are shown in FIG. 2. When $N_2$:$O_2$=95:5, adsorption of NO was very small, and the intensity of an absorption shown at from 1,200 to 1,500 cm$^{-1}$ increased along with increase in the amount of $O_2$ introduced up to 30%.

EXAMPLE 2

As a sample, a powder having a composition of $K_{1.9}Ga_{1.9}Sn_{6.1}O_{16}$ prepared by mixing oxides and a carbonate i.e. $K_2CO_3$, $Ga_2O_3$ and $SnO_2$ as materials, followed by heat treatment at a temperature of at least 1,375° C. for 24 hours, was used. As an evaluation method, diffuse reflection infrared spectroscopy (DRIFTS) was employed. The powder sample was subjected to a heat treatment in a stream of a carrier gas having a $N_2$—$O_2$ gas mixed with He as an inert gas (50 ml min$^{-1}$) at 973 K for 15 minutes, and immediately after the heat treatment, NO (about 8,000 ppm) was adsorbed by the sample at room temperature, and then the NO adsorption state on the surface was observed while raising the temperature to 973 K.

The powder samples subjected to the heat treatment under a carrier gas condition of $N_2$:$O_2$=60:40 to 95:5 were measured, whereupon absorptions by $NO_2$ or $NO_3$ molecular species considered to be adsorbed on the surface of $K_{1.9}Ga_{1.9}Sn_{6.1}O_{16}$ were confirmed at 1,364 and 1,395 cm$^{-1}$. Increase in intensity of an absorption shown at from 1,200 to 1,500 cm$^{-1}$ was confirmed along with increase in the amount of $O_2$ introduced up to 30%.

EXAMPLE 3

As a sample, a powder having a composition of $K_{1.9}Ga_{1.9}Sn_{6.1}O_{16}$ prepared by mixing oxides and a carbonate i.e. $K_2CO_3$, $Ga_2O_3$ and $SnO_2$ as materials, followed by heat treatment at a temperature of at least 1,375° C. for 24 hours, was used. As an evaluation method, diffuse reflection infrared spectroscopy (DRIFTS) was employed. The powder sample was subjected to a heat treatment in a stream of a $N_2$—$O_2$ mixed carrier gas under a total pressure of the mixed gas of oxygen gas and nitrogen gas of about 0.3 atm (50 ml min$^{-1}$) at 973 K for 15 minutes while making the pressure to be at most atmospheric pressure by a rotary pump. Immediately after the heat treatment, NO (about 8,000 ppm) was adsorbed by the sample at room temperature, and then the NO adsorption state on the surface was observed while raising the temperature to 973 K.

The powder samples subjected to the heat treatment under a carrier gas condition of $N_2$:$O_2$=60:40 to 95:5 were measured, whereupon absorptions by $NO_2$ or $NO_3$ molecular species considered to be adsorbed on the surface of $K_{1.9}Ga_{1.9}Sn_{6.1}O_{16}$ were confirmed at 1,366 and 1,398 cm$^{-1}$. Increase in intensity of an absorption shown at from 1,200 to 1,500 cm$^{-1}$ was confirmed along with increase in the amount of $O_2$ introduced up to 30%.

EXAMPLE 4

As a sample, a thin film having a composition of $K_{1.9}Ga_{1.9}Sn_{6.1}O_{16}$ was prepared by a sol-gel method in accordance with a method as disclosed in Japanese Patent Application No. 2000-176462. Using $K(n-OC_3H_7)$, $Ga(n-OC_4H_9)_3$ and $Sn(t-OC_4H_9)_4$ which are metal alkoxides as materials, each material was dissolved in $CH_3OC_2H_4OH$ as an organic solvent, and the respective solutions were mixed to prepare a precursor solution. As a substrate, a YSZ polycrystalline substrate having a dehydration treatment applied thereto by ultrasonic cleaning in acetone, was used.

Figure 3A:
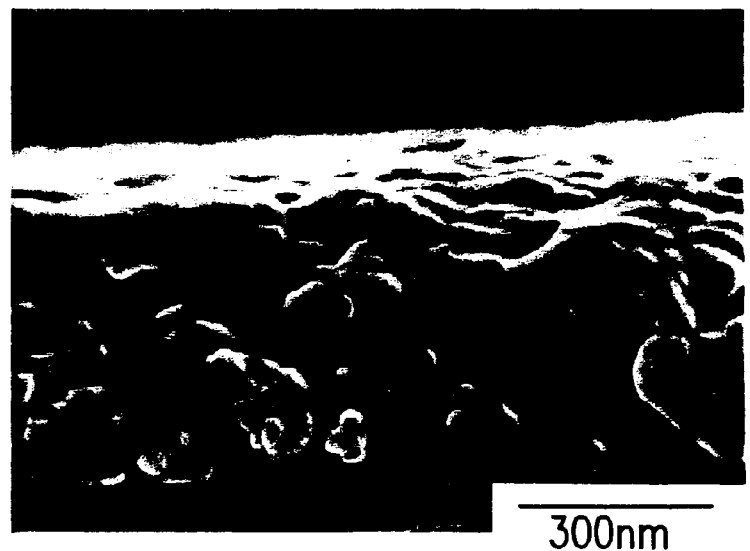
FIG. 3 is a photograph showing an image of a $K_{1.9}Ga_{1.9}Sn_{6.1}O_{16}$ thin film having a hollandite-type crystal structure observed by a scanning electron microscope (Example 4: thin film formed on a YSZ single crystal substrate).
Figure 3B:
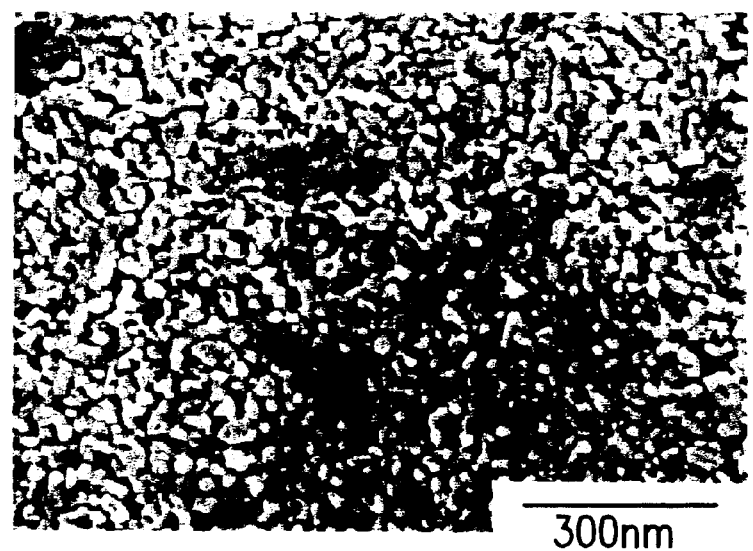

The precursor solution was coated on the substrate by means of a spin coating method (5,000 rpm, 20 sec), followed by heat treatment at 973 K for 3 hours to form a film. As a thin film obtained by conducting the process of coating and heat treatment three times, flat and transparent one having no cracks, having a film thickness of about 500 nm and having primary particles of several tens nm densely aggregated as shown in FIG. 3, was used. As an evaluation method, diffuse reflection infrared spectroscopy (DRIFTS) was employed. The thin film was subjected to a pretreatment in a stream of a N$_2$—O$_2$ mixed carrier gas (50 ml min$^{-1}$) at 968 K for 5 minutes, NO (about 8,000 ppm) was adsorbed by the thin film at room temperature, and then the NO adsorption state on the surface was observed while raising the temperature to 968 K in a stream of the carrier gas again.

Figure 4:
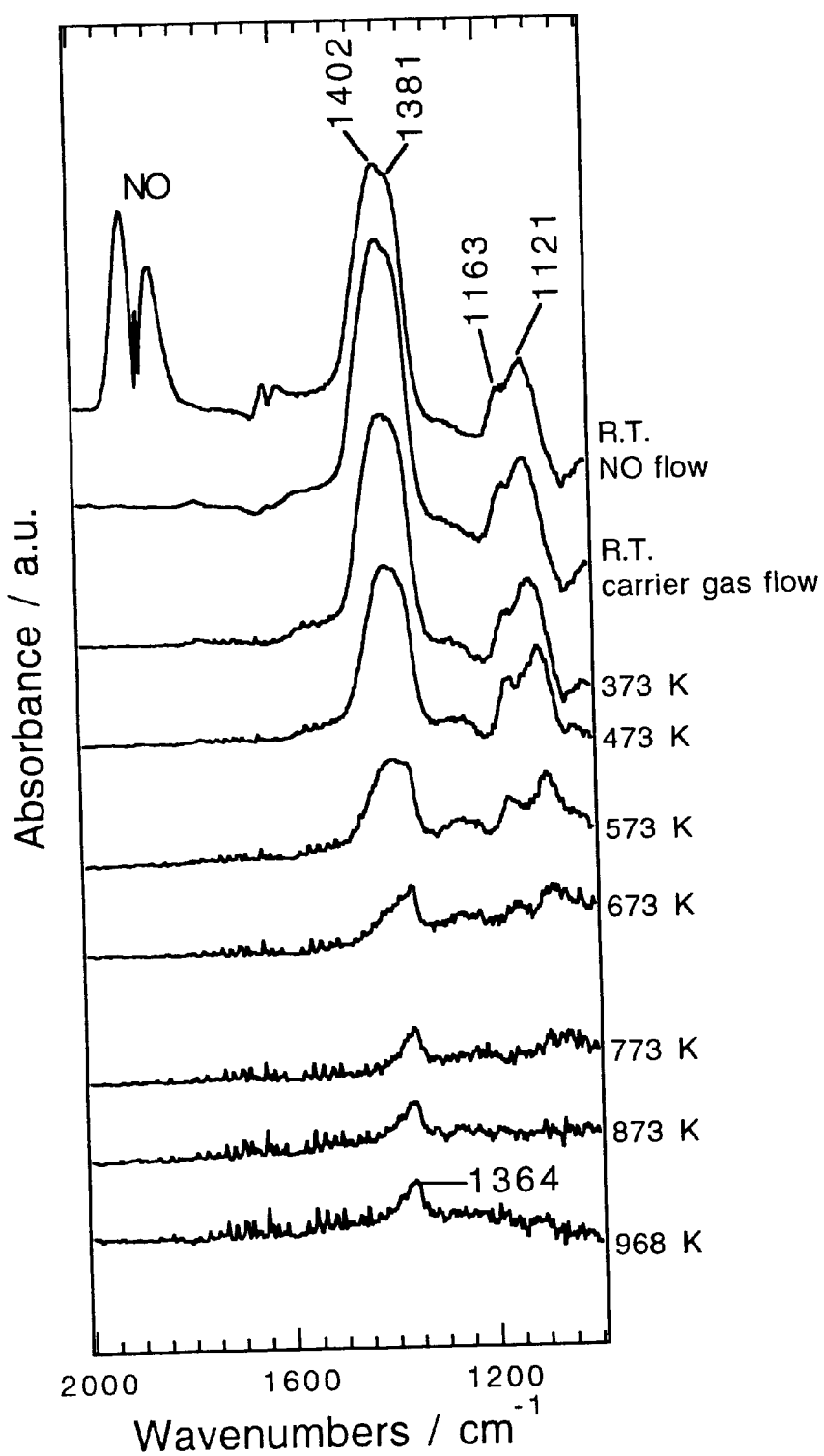
FIG. 4 is a diagram illustrating diffuse reflection infrared spectra at from room temperature to 968 K [Example 4: carrier gas ($N_2:O_2=60:40$)].

With respect to the thin film sample subjected to the heat treatment under a carrier gas condition of N$_2$:O$_2$=60:40, DRIFT spectra after NO adsorption at room temperature are shown in FIG. 4. Peaks at 1,850 and 1,904 cm$^{-1}$ are attributable to gaseous phase NO in a diffuse reflection cell. Further, absorptions of NO$_2$ or NO$_3$ molecular species considered to be adsorbed on the surface of K$_{1.9}$Ga$_{1.9}$Sn$_{6.1}$O$_{16}$ were confirmed at 1,121, 1,163, 1,381 and 1,402 cm$^{-1}$. The absorption intensity gradually decreased during the step of raising the temperature from room temperature to 968 K, but the absorption species corresponding to a peak at 1,364 cm$^{-1}$ did not disappear to the end.

Figure 5:
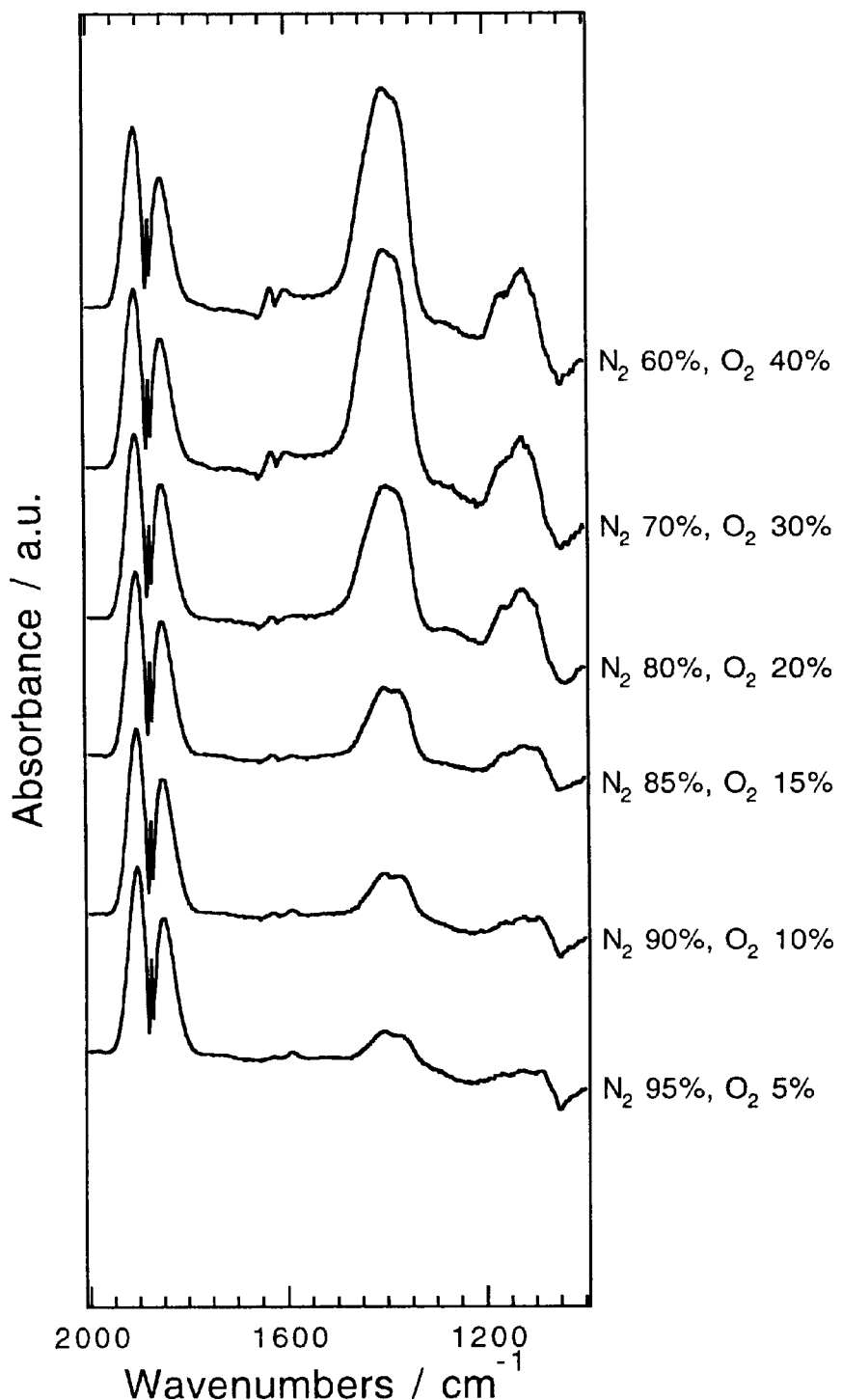
FIG. 5 is a diagram illustrating diffuse reflection infrared spectra at room temperature [Example 4: influence of the proportion of oxygen in a carrier gas].

Then, similar experiments were carried out by changing the proportion of N$_2$ and O$_2$ in the carrier gas. In FIG. 5 are shown spectra when NO was adsorbed at room temperature. The amount of NO adsorbed was very small when N$_2$:O$_2$=95:5, and intensity of absorptions shown at from 1,000 to 1,500 cm$^{-1}$ increased along with increase in the amount of O$_2$ introduced up to 30%.

EXAMPLE 5

As a sample, a powder having a composition of K$_{1.9}$Fe$_{1.9}$Sn$_{6.1}$O$_{16}$ prepared by mixing oxides and a carbonate i.e. K$_2$CO$_3$, Fe$_2$O$_3$ and SnO$_2$ as materials, followed by heat treatment at a temperature of at least 1,350° C. for 24 hours, was used. As an evaluation method, diffuse reflection infrared spectroscopy (DRIFTS) was employed in the same manner as in Example 1. The powder sample was subjected to a heat treatment in a stream of a N$_2$—O$_2$ mixed carrier gas (50 ml min$^{-1}$) at 968 K for 15 minutes. Immediately after the heat treatment, NO (about 8,000 ppm) was adsorbed by the sample at room temperature, and the NO adsorption state on the surface was observed while raising the temperature to 968 K in a stream of the carrier gas again.

The powder samples subjected to the heat treatment under a carrier gas condition of N$_2$:O$_2$=60:40 to 95:5 were measured, whereupon absorption by NO$_2$ or NO$_3$ molecular species considered to be adsorbed on the surface of K$_{1.9}$Fe$_{1.9}$Sn$_{6.1}$O$_{16}$ was confirmed in the vicinity of 1,250 cm$^{-1}$. Increase in intensity of an absorption shown at from 1,000 to 1,500 cm$^{-1}$ was confirmed along with increase in the amount of O$_2$ introduced up to 30%.

Comparative Example 1

As a sample, a powder having a composition of K$_{1.9}$Ga$_{1.9}$Sn$_{6.1}$O$_{16}$ was used. This powder was prepared by mixing oxides and a carbonate i.e. K$_2$CO$_3$, Ga$_2$O$_3$ and SnO$_2$ as materials, followed by heat treatment at a temperature of at least 1,375° C. for 24 hours, in the same manner as in Example 1. An evaluation method was the same as in Example 1.

Figure 6:
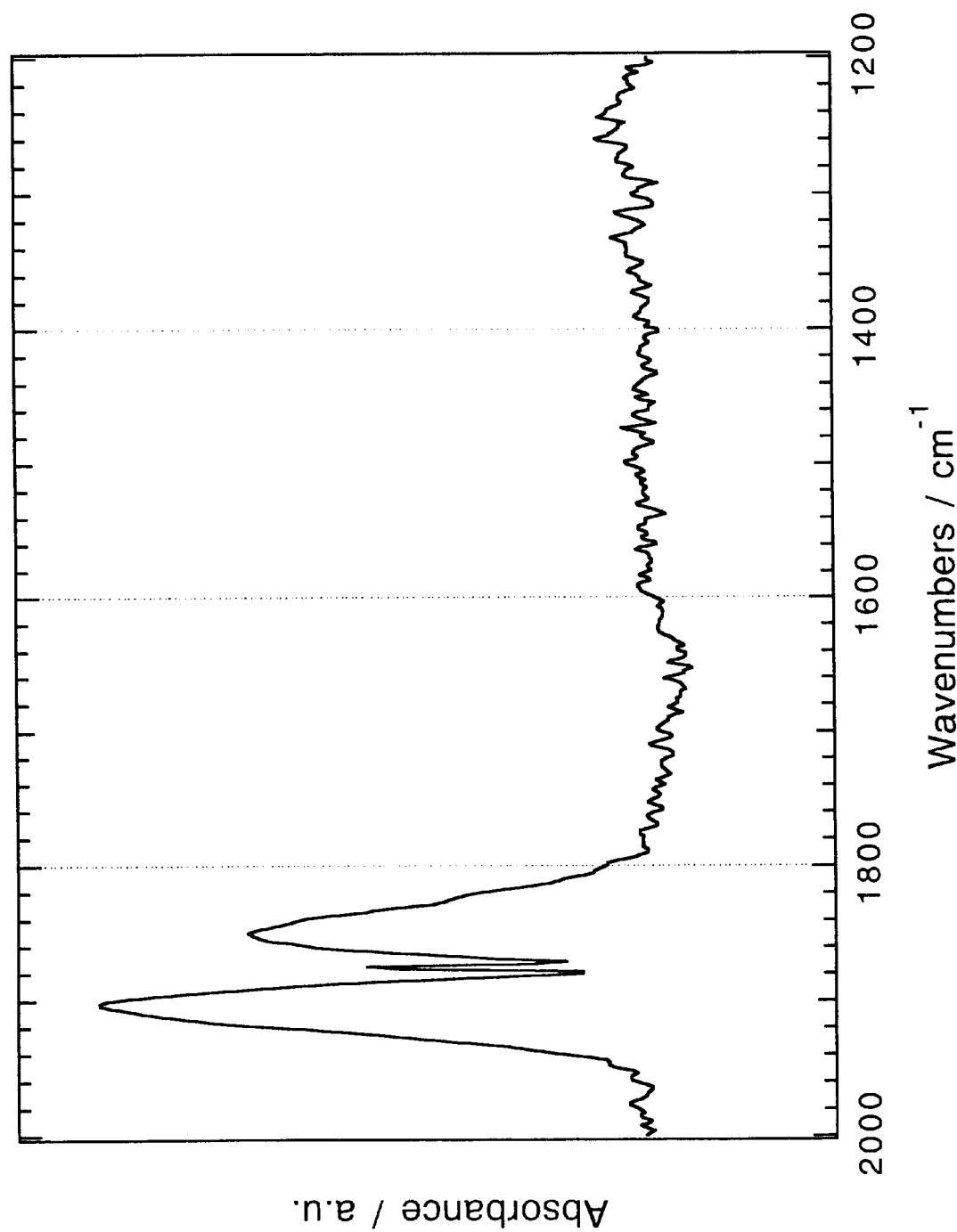
FIG. 6 is a diagram illustrating a diffuse reflection infrared spectrum at room temperature [Comparative Example 1: carrier gas ($N_2:O_2=100:0$)].

With respect to a powder sample subjected to no heat treatment under a carrier gas condition of N$_2$:O$_2$=100:0, a DRIFT spectrum after NO adsorption at room temperature is shown in FIG. 6. Peaks at 1,850 and 1,904 cm$^{-1}$ are attributable to gaseous phase NO in a diffuse reflection cell. Except for these peaks, substantially no absorption considered to be attributable to adsorption was confirmed.

Comparative Example 2

As a sample, a thin film having a composition of K$_1$Ga$_{1.9}$Sn$_{6.1}$O$_{16}$ was prepared by a sol-gel method in accordance with a method as disclosed in Japanese Patent Application No. 2000-176462, in the same manner as in Example 2. Using K(n-OC$_3$H$_7$), Ga(n-OC$_4$H$_9$)$_3$ and Sn(t-OC$_4$H$_9$)$_4$ which are metal alkoxides as materials, each material was dissolved in CH$_3$OC$_2$H$_4$OH as an organic solvent, and the respective solutions were mixed to prepare a precursor solution. As a substrate, a YSZ polycrystalline substrate having a dehydration treatment applied thereto by ultrasonic cleaning in acetone, was used. The precursor solution was coated on the substrate by means of a spin coating method (5,000 rpm, 20 sec), followed by heat treatment at 973 K for 3 hours to form a film. The evaluation method was the same as in Example 2.

Figure 7:
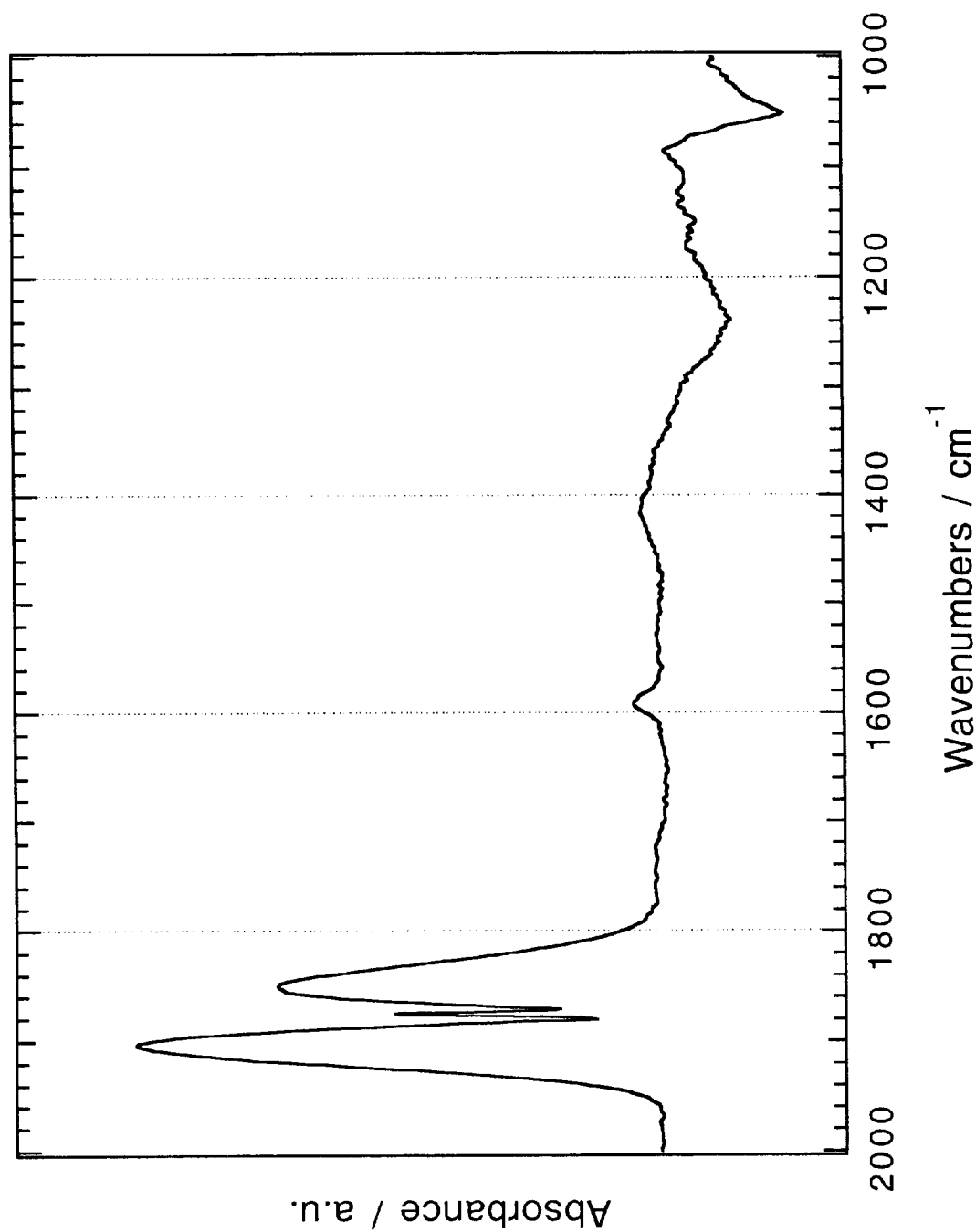
FIG. 7 is a diagram illustrating a diffuse reflection infrared spectrum at room temperature [Comparative Example 2: carrier gas ($N_2:O_2=100:0$)].

With respect to a thin film sample subjected to no heat treatment under a carrier gas condition of N$_2$:O$_2$=100:0, a DRIFT spectrum after NO adsorption at room temperature is shown in FIG. 7. Peaks at 1,850 and 1,904 cm$^{-1}$ are attributable to gaseous phase NO in a diffuse reflection cell. Except for these peaks, substantially no absorption considered to be attributable to adsorption was confirmed.

The entire disclosure of Japanese Patent Application No. 2000-277137 filed on Sep. 12, 2000 including specification, claims, drawings and summary are incorporated herein by reference in its entirety.

What is claimed is:

1. A method of treating a hollandite compound to improve its adsorption of nitrogen monoxide, the method comprising subjecting a hollandite compound, which has a hollandite crystal structure and is represented by a chemical formula $$A_xM_yN_{8-y}O_{16},$$

where
A is an alkali metal or an alkaline earth metal selected from the group consisting of K, Na, Rb, and Ca;
M is a bivalent or trivalent metal element selected from the group consisting of Fe, Ga, Zn, In, Cr, Co, Mg, Al, and Ni;
N is a tetravalent metal element selected from the group consisting of Sn and Ti;
0<x≦2; and
0<y2, to a heat treatment in a stream of an oxygen-nitrogen mixture comprising oxygen gas and nitrogen gas mixed in a volume ratio of 3:97 to 50:50, at a temperature of from 50 to 1,500° C. for from 5 minutes to 1 hour.

2. The method according to claim 1, wherein the oxygen-nitrogen mixture further comprises an inert gas.

3. The method according to claim 1, wherein the oxygen-nitrogen mixture comprises the oxygen gas and nitrogen gas mixed in a volume ratio of 5:95 to 50:50 under a reduced pressure of at most atmospheric pressure.

4. The method according to claim 1, wherein the hollandite compound is

K$_x$Ga$_y$Sn$_{8-y}$O$_{16}$;
x=y; and
0.8<x≦2.

5. An adsorbent for nitrogen oxides, the adsorbent comprising a hollandite compound whose adsorption of nitrogen monoxide has been improved to be at least 25 μmol/m$^2$ by the method of claim 1.

6. The method according to claim 1, wherein N is Ti.

* * * * *